July 11, 1972  O. S. GRAY  3,676,058
MICROWAVE TREATING APPARATUS AND METHOD

Filed May 25, 1970  2 Sheets-Sheet 1

INVENTOR:
OSCAR S. GRAY
BY
Howson & Howson
ATTYS

July 11, 1972          O. S. GRAY          3,676,058
MICROWAVE TREATING APPARATUS AND METHOD
Filed May 25, 1970          2 Sheets-Sheet 2
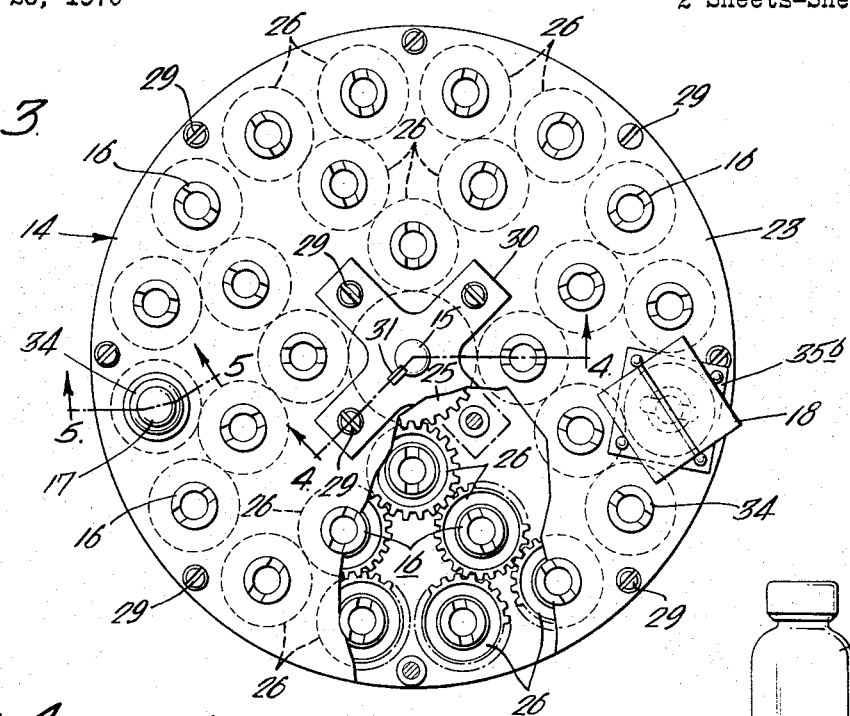
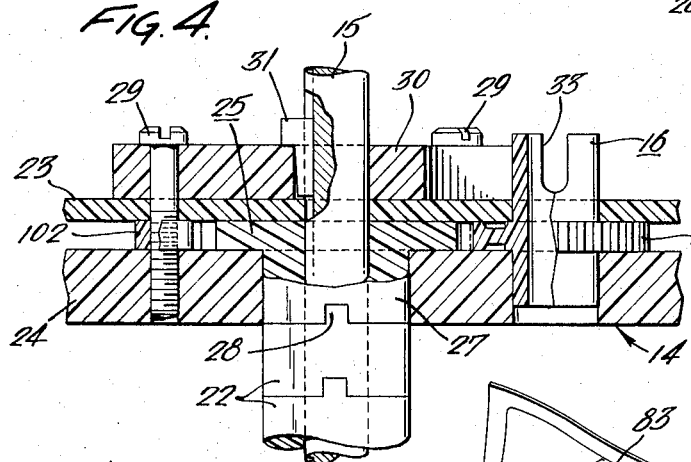
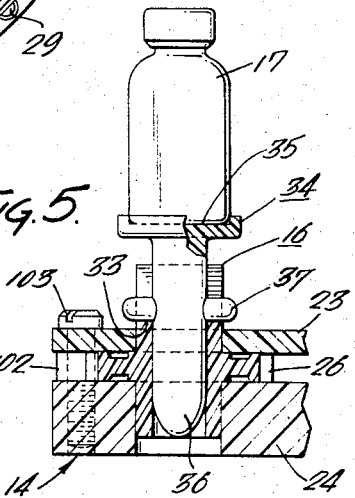
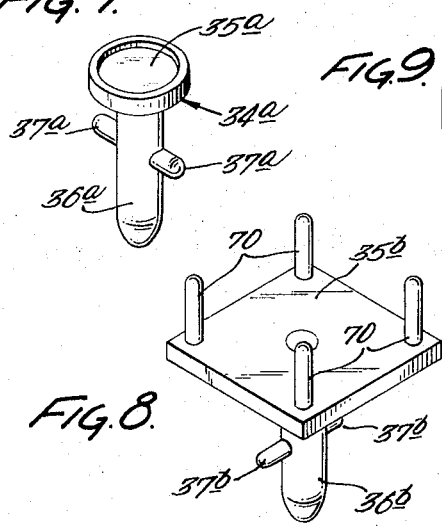
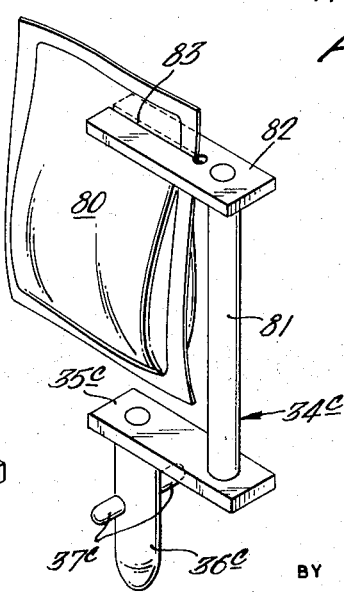
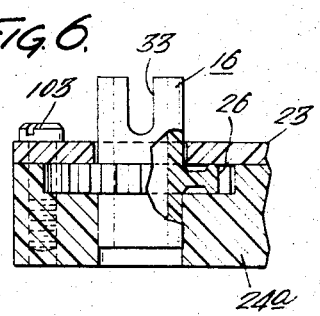
INVENTOR:
OSCAR S. GRAY
BY Howson & Howson
ATTYS.

United States Patent Office

3,676,058
Patented July 11, 1972

3,676,058
MICROWAVE TREATING APPARATUS AND METHOD
Oscar S. Gray, Fort Lauderdale, Fla., assignor to Gray Industries, Inc., Fort Lauderdale, Fla.
Continuation-in-part of application Ser. No. 817,181, Apr. 17, 1969. This application May 25, 1970, Ser. No. 40,327
Int. Cl. A61l 3/00; A23l 3/08; B65b 55/02
U.S. Cl. 21—54 R     17 Claims

ABSTRACT OF THE DISCLOSURE

An apparatus for treating articles with microwave energy involving a chamber; means for admitting microwave energy into the chamber; means for supporting articles to be treated by said microwave energy comprising a main rotatable turntable and, mounted on said main turntable, at least one minor rotatable turntable small relative to said main turntable and adapted to rotate individually as the main turntable rotates so that said minor turntable rotates while at the same time passing in an arc, defined by the rotation of the said main turntable, toward, past and away from said site where said microwave energy is admitted to said chamber. There is also provided a method for treating an article with microwave energy wherein the article, while being subjected to microwave energy, is rotated in a plurality of modes of different magnitude.

RELATIONSHIP TO OTHER APPLICATIONS

This application is a continuation-in-part of my copending application Ser. No. 817,181 filed Apr. 17, 1969.

BACKGROUND OF THE INVENTION

The treatment of articles with microwave energy is known. In particular it is known that microorganisms (bacteria, viruses and fungi) and enzymes on or in materials containing them can be controlled (e.g. pasteurization, partial sterilization or sterilization in the case of microorganisms and deactivation or stabilization in the case of enzymes) by exposing the material to controlled microwave energy. Thus, my U.S. Pat. No. 3,494,722 is directed to a method and apparatus for sterilizing articles, like medical hardware and supplies, involving the conjoint use of microwaves and steam; my U.S. Pat. No. 3,494,723 is directed to a method and apparatus for controlling microorganisms and enzymes involving the conjoint use of microwaves and a coolant gas; my U.S. Pat. No. 3,494,724 is directed to a method and apparatus for controlling microorganisms and enzymes involving the conjoint use of microwave energy, infrared radiation and steam; and my said copending application Ser. No. 817,181 discloses the stabilization of enzymes by subjecting containers of pre-cooled enzyme-containing material to microwaves and a coolant gas. In addition, my U.S. Pat. No. 3,439,510 is directed to the treatment of red blood cells to improve the morphology thereof by controlled treatment with microwaves and a coolant gas.

Apparatus is shown in the foregoing patents for treatment of moving articles. For example, U.S. Pat. No. 3,494,722 discloses apparatus in which articles are supported on trays which in turn are supported on a central shaft such that, when the shaft is rotated, the trays are moved in an arc toward, past and away from the site at which microwave energy is admitted to the treatment chamber.

It is the object of the present invention to provide novel apparatus for treating articles with microwave energy whereby all parts and surfaces of the article are more thoroughly and uniformly subjected to microwave energy than heretofore.

It is another object of the present invention to provide apparatus of the type described in which greater control of the microwave treatment can be achieved regardless of the size or shape of the article or articles being treated.

Other objects, including the provision of a novel method for treating articles with microwave energy, will become apparent from a consideration of the following specification and claims.

BRIEF SUMMARY OF THE INVENTION

The novel apparatus of the present invention comprises a chamber, means for admitting microwave energy into said chamber through a wall thereof at a predetermined site; means for supporting articles to be treated by said microwave energy comprising a main turntable adapted to rotate in a plane generally parallel to the plane in which said microwave energy is admitted to said chamber at said site and, supported on said main turntable at a point spaced from the center of said main turntable, at least one relatively small turntable adapted to support an article for treatment with said microwave energy, and drive means for rotating said main turntable and at the same time rotating said relatively small turntable individually whereby said relatively small turntable rotates while at the same time passing in an arc, defined by the rotation of said main turntable, toward, past and away from said site where said microwave energy is admitted into said chamber.

In a preferred embodiment, a plurality of relatively small rotatable turntables is supported on said main turntable and spaced from the center thereof so that a plurality of articles may be treated at one time. In another preferred embodiment means are provided for admitting a gas under superatmospheric pressure to said chamber for contact with the external surfaces of the article or articles while they are being subjected to microwave energy.

BRIEF DESCRIPTION OF THE DRAWINGS

FIG. 3 is a plan view, partly in section, taken along the line 3—3 in FIG. 2;

FIG. 4 is an enlarged fragmentary transverse view taken along the line 4—4 in FIG. 3;

FIG. 5 is a similar view, taken along the line 5—5 in FIG. 4;

FIG. 6 is an enlarged sectional view, similar to FIG. 5 but illustrating a modified construction;

FIGS. 7, 8 and 9 are perspective views illustrating various forms of support pedestals for use on the relatively small turntable.

As will appear from the detailed description, the present apparatus and method are adapted to treating an article, such as a closed container of material, and especially a plurality of articles of varying sizes and shapes either from run to run or at the same time, in a manner whereby precise control can be achieved by various means the principal of which is through rotation movement of the article being treated in a plurality of modes of different magnitude both with respect to number of times each surface of the article is subjected to maximum contact with the microwave energy and with respect to the degree and number of relative transverse and lateral changes in the position of the article with respect to the site of admission of the microwave energy into the treating chamber. Additional control is provided through transverse (axial) adjustment of the position of the turntable assembly relative to the general plane of movement of the microwave energy into the chamber as well as in the power and frequency (and corresponding wavelength) of the microwave energy and in the type and temperature of the gas atmosphere employed.

DESCRIPTION OF PREFERRED EMBODIMENTS

Figure 1:
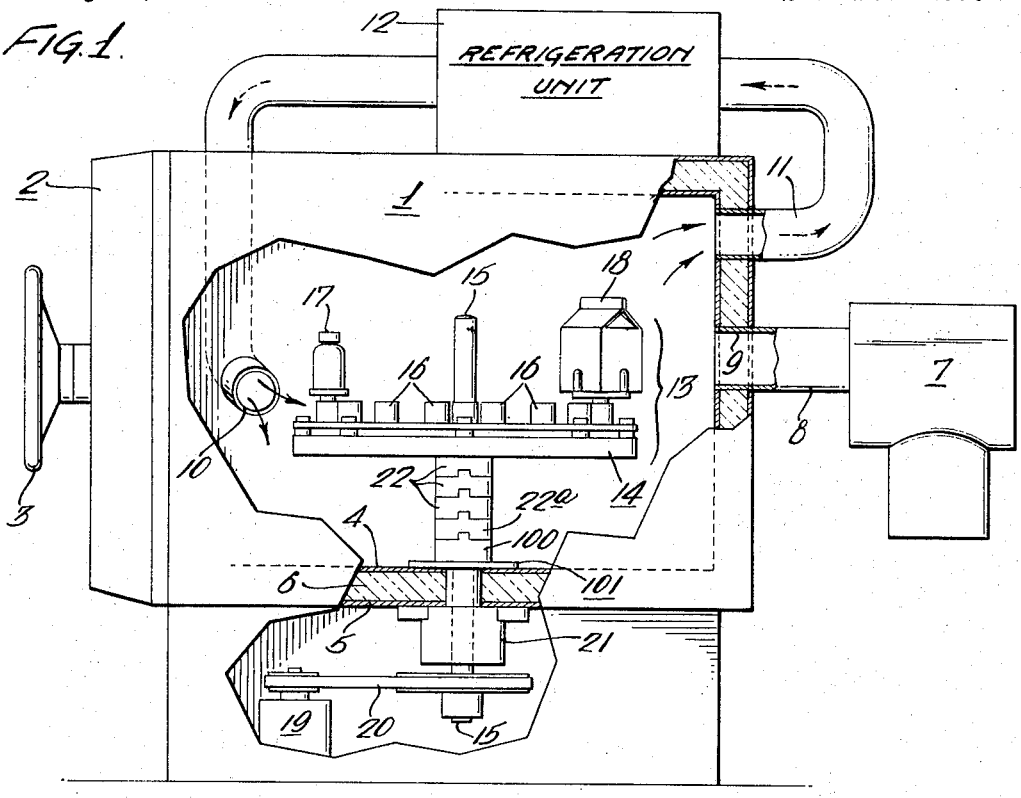
FIG. 1 is a side elevational view, partly in section, generally showing apparatus of the type to which the present invention is directed.

Referring then to the drawings, in FIG. 1, numeral 1 represents an enclosed chamber provided with a door 2 operated as by handle 3. Chamber 1 is constructed of electrically conducting material like aluminum or steel, including stainless steel, and is preferably of a multilayer construction having inner and outer layers 4 and 5, respectively, of electrically conducting material, and an intervening layer 6 of thermally insulating material like fiber glass or foamed plastic like polystyrene or polyurethane. A source of microwave energy, such as a conventional magnetron 7, is provided connected to a power supply (not shown) and coupled to the interior of chamber 1 through wave guide 8 and opening 9. Over opening 9 may be placed a microwave-permeable plate (not shown) for example of borosilicate glass or quartz. When a gas under superatmospheric pressure is employed, this may be admitted to chamber 1 as through conduit 10 and removed as through conduit 11. When the gas is a cooled gas, like chilled air, nitrogen, and the like, it may be recirculated to chamber 1, following rechilling as in refrigeration unit 12.

Figure 2:
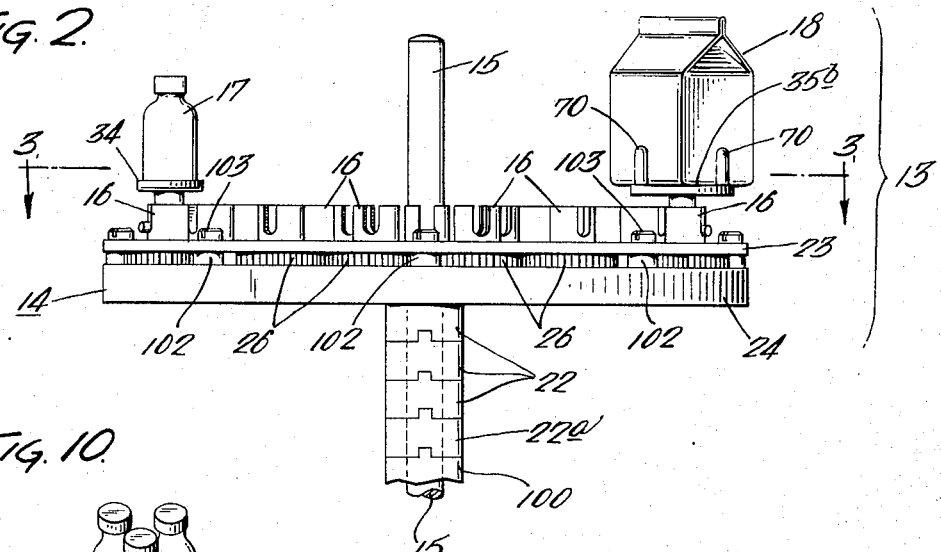
FIG. 2 is an enlarged side elevational view showing in greater detail preferred means for supporting articles to be treated.

As illustrated in FIGS. 1 and 2, the turntable assembly of the present invention is shown generally as 13, and comprises a main turntable unit 14 mounted on a central shaft 15. Supported on main turntable unit 14 are individual smaller turntables 16 adapted to rotatably support articles, such as containers, illustrated as sealed bottle 17 and wax- or plastic-coated paper carton 18, holding material to be treated with microwaves. The turntable assembly 13 is driven as by a variable speed motor 19 through a drive train generally designated as 20, shaft 15 passing through the bottom wall of chamber 1 and being journaled in a bearing as designated generally by number 21. The height of the turntable assembly, and hence the position of articles 17 and 18 relative to the general plane of the microwave energy entering through opening 9, can be adjusted in any suitable manner. The means illustrated is a plurality of removable spacer discs 22, interlocked by mating lugs and slots, any desired number of which discs can be slid onto shaft 15, main turntable unit 14 then being supported on the uppermost spacer as shown hereinafter. Lowermost spacer disc, designated as 22a, rests on and is interlocked with hub 100 which may be attached to or be an integral part of support plate 101. Support plate 101, including its associated hub 100, is fixedly attached to bottom wall of chamber 1, such as by bolts (not shown). Thus, base plate 101, hub 100 and spacer discs 22 do not rotate when shaft 15 is rotated.

Referring to FIGS. 2-5, main turntable unit as illustrated comprises a top plate 23 and a bottom plate 24. Plates 23 and 24 are spaced apart to accommodate a gear assembly made up of a central, or sun, gear 25 and associated planet, or pinion, gears 26. To provide adequate spacing to permit free movement of the gears relative to top and bottom plates 23 and 24, respectively, spacer lugs 102 are provided through which bolts 103 extend. Central, or sun, gear 25 is illustrated as having a lower hub portion 27 having a notch in its bottom surface adapted to receive and lock with a lug, 28, in uppermost spacer 22. Thus, central gear 25 does not rotate. Top plate 23 and bottom plate 24 are interconnected and secured as by bolts 29 passing through spider plate 30, top plate 23 and bottom plate 24 and keyed to shaft 15 as by pin 31, such that rotation of shaft 15 causes rotation about it as axis of main turntable unit 14. As stated, however, central gear 25 does not rotate.

On main turntable unit 14 are mounted individual turntables 16, small relative to main turntable unit 14, and shown as hollow cylinders or sockets extending through an opening in top plate 23 and into or through an opening in bottom plate 24. Each relatively small turntable 16 is provided with a notch or notches 33 in the upper side wall thereof and forms the central shaft of a planet, or pinion, gear 26. To support an article or articles on a small turntable 16, a pedestal 34 is mounted thereon. Pedestal 34, as illustrated, has a top supporting surface 35 and a base shaft or pin 36 adapted to slide into central opening of turntable 16. Base shaft or pin 36 of pedestal 34 is provided with a lug or lugs 37 adapted to fit slot or slots 33 in turntable 16 and to seat on the bottom thereof. Thus, when a small turntable 16 rotates, its associated pedestal also rotates.

The teeth of a planet gear 26 adjacent central gear 25 are in engagement with the teeth of the latter. And the teeth of the former are likewise in engagement with the teeth of a planet gear further removed from central gear 25. Thus when main turntable unit 14 is rotated about its axis and about stationary central gear 25, each smaller turntable 16 rotates about its own axis while at the same time moving in an arc or orbit, the diameter of which is defined by its distance from the center of main turntable unit 14, toward, past and away from the site where the microwave energy is admitted to chamber 1, namely opening 9. By appropriate selection of the relative diameters of central gear 25 and planet gears, the number of revolutions per unit time of a small turntable 16 can be controlled to be the same as, less than or greater than the number of revolutions per unit time of main turntable unit 14. The important feature is that as each small turntable, and its associated pedestal and article or articles supported thereon, is moving in the stated relatively large arc or obit, it is simultaneously and individually rotating about its own axis, more uniformly to present all sides of the article or articles thereon to the microwave energy field, as compared to a single rotational movement either in an arc or orbit or about its axis. When a gas is admitted to the treating chamber as in accordance with the preferred embodiment to effect control of the microwave treatment and other improved results as described in my abovementioned patents, the present apparatus and method provide more effective and uniform contact of the walls of the articles by the gas, and hence more overall uniform control through the combined effects of the microwave energy and gas.

FIG. 6 shows a modification of the structure shown in FIG. 5 wherein the space required for each planet gear 26 is provided by machining a depression in the top of bottom plate 24a.

Figure 10:
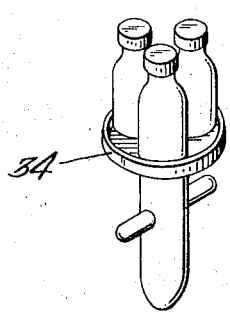
FIG. 10 is a perspective view illustrating a supporting pedestal holding a plurality of articles on a single relatively small turntable.

Referring to FIGS. 7-9, these illustrate various forms of pedestals that may be selected and used depending upon the size or shape of the article being treated. FIG. 7 shows a simple pedestal 34a, comprising supporting surface 35a, shaft or pin 36a and lugs 37a. Pedestal 34a may support a single container, like a seal bottle or vial, for rotation about its own axis, or, as illustrated in FIG. 10, the relative size of the supporting surface and the articles or containers may be such that a plurality of articles or containers may be supported on a single pedestal in which case each article or container on the pedestal does not rotate about its own axis but in an arc or orbit about the center of smaller turntable 16 which arc or orbit, however, is relatively small compared to the arc or orbit described by each smaller turntable 16 while it rotates about the center of main turntable unit 14. FIG. 8 illustrates a form of pedestal that may be used with larger articles, such as containers having a square cross-section as shown in FIGS. 1 and 2. This pedestal comprises supporting surface 35b, shaft or pin 36b, lugs 37b and retaining posts 70. FIG. 9 illustrates a pedestal 34c adapted for supporting a plastic pouch container 80, and comprises supporting surface 35c, shaft or pin 36c, lugs 37c, post 81 and holder 82 containing slot 83 adapted frictionally to grip the top portion of pouch 80. Pouch 80 rotates about its own vertical axis since post 81 is offset from the center of shaft 36c about half the width of pouch 80. However, post 81 need not be so offset in which case pouch 80 can be made to rotate in a small arc or orbit as pedestal 34c rotates. To accommodate articles of various sizes and shapes many variations of interchangeable pedestals can be prepared having in common a shaft and lugs adapted to fit the opening and slots of a small turntable 16. Thus, with the present apparatus a plurality of articles varying as to size or shape or both may be treated at the same time, or a plurality of similar articles may be treated at the same time, and, in a subsequent treatment, a plurality of similar articles, but different from those in the preceding treatment, may be treated by appropriate change in the pedestals used.

In carrying out the method utilizing the present apparatus door 2 of chamber 1 is opened. A pedestal or pedestals appropriate to the particular article or articles to be treated is or are mounted in the desired smaller turntable or turntables 16, and the articles or articles are placed thereon. Door 2 is closed, and motor 19 is started, rotating main turntable unit 14 at the desired rotational speed (r.p.m.). Coolant gas, when used, is admitted through conduit 10 and magnetron 7 is turned on admitting microwave energy into chamber 1 through opening 9. With central gear 25 remaining stationary but planet gears 26 moving in orbits therearound, the planet gears rotate. Hence, each article rotates either about its own vertical axis or in a small arc or orbit while simultaneously traveling in a large arc or orbit toward, past and away from the incoming microwave energy (and incoming coolant gas when used). After the desired length of treatment, magnetron 7 is turned off. Admission of coolant gas is discontinued, after a possible delay where cooling of the article after treatment with the microwave energy is desired, and motor 19 is stopped. Chamber 1 may then be opened and the treated articles removed.

As is well known, microwave energy is the electromagnetic wave energy of a wave length falling in the microwave region of the electromagnetic spectrum. The Federal Communication Commission has presently set aside, for microwave processing, bands of microwave energy within the range of between about 400 and about 20,000 megacycles per second with a wave length ranging from about 13 inches for the lower frequencies to about .7 inch for the highest frequencies; specifically: frequencies of about 890–940 with a wave length of about 13 inches, frequencies of about 2300–2500 with a wave length of about 4–5 inches, and frequencies of 17,850–18,000 with a wave length of about 0.7 inch. The presently preferred microwave energy for use according to the present invention is an intermediate range having a frequency from about 1000 to about 5000, more particularly from about 2000 to about 3000 megacycles per second. Microwave energy is generated from a suitable high frequency source, such as a magnetron. The generation and use of microwave energy by itself is well known since such has been used for many years in the cooking of food.

As stated, in accordance with a preferred embodiment of the present invention there is provided means for contacting the article or articles being treated with a stream of coolant gas such as chilled air, nitrogen, carbon dioxide, ethylene oxide, argon, or the like, in accordance with the subject matter disclosed and claimed in U.S. Pat. No. 3,494,723. The temperature of the coolant gas entering the treating zone should be below about 60° F., and is preferably below about 55° F. While the temperature thereof may go as low as 0° F., there is no advantage in its going below about 20° F. and at such lower temperatures there may be freezing problems if material is left in the treating chamber containing the cold gas for extended periods after the source of microwave energy has been turned off. A temperature for the incoming gas between about 30 and about 50° F. has been found to be particularly suitable. The coolant gas will become warmed during its travel through the treating chamber particularly from contact with the walls of the container holding the material being treated, and the warmed gas is removed from the treating chamber making way for incoming coolant gas. When the gas is recirculated for reuse, the temperature thereof must be reduced back to the desired temperature for admission to the treating zone.

Since the one principal function of the coolant gas is to keep the walls of the container at a temperature well below that of the material being treated, forcing the coolant gas into the treating chamber and past the walls of the container under at least some positive pressure (at least slightly above atmospheric pressure) provides more efficient overall cooling without some area or areas of the walls becoming insufficiently cooled. Pressures as low as 0.03 p.s.i.g. have been used and pressures as high as 50 p.s.i.g. may be desirable. Air is particularly satisfactory at low positive pressures, whereas a substantially oxygen-free gas, especially nitrogen, is preferred at higher pressures.

The apparatus of the present invention as shown in FIGS. 2–10 will, where feasible, be made of microwave-permeable materials, such as polyethylene, polypropylene, polymethylmethacrylate, polyethylene terephthalate, and the like.

The present invention is applicable to the treatment of any material with microwaves for any purpose. This may include pasteurization, partial sterilization or sterilization in the case of microorganisms, or enzyme deactivation, or the stabilization of materials, like enzymes. This includes treatment of foodstuffs which are perishable, that is, which are subject to deleterious change by the action of microorganisms (bacteria and/or fungi) or enzymes and which contain moisture. The food may range in consistency from thin liquids to solids. Examples of such foodstuffs are milk (whole milk, homogenized whole milk, skimmed milk, concentrated milk and the like products); fruit and vegetables juices (including juice concentrates); beer, wine and other manufactured beverages, like "soft" drinks, soups; grains, like raw or cooked corn, and cooked rice; vegetables; fruit; stews; soups; meat, including fish and poultry; eggs, pastries; bread; sandwiches; and the like. The food as treated may be raw, cooked (including baked) or partially cooked. Also applicable are materials which although they are organic materials of natural origin like the foodstuffs mentioned above, are not normally considered edible, such as blood (whole, plasma or serum or other blood fractions), tobacco, and the like, but which nevertheless are subject to deterioration by the action of microorganisms or enzymes or contain materials like enzymes which it is desired to stabilize. Also included are materials like pharmaceuticals which, whether essentially organic or inorganic, are subject to such deterioration or may serve as carriers of undesirable microorganisms. With such materials, both edible and inedible, the principal result of treatment is preservation in packaged form. Also included are materials which, although deterioration thereof is not a principal problem nevertheless act as carriers for microorganisms which can contaminate other materials or living bodies and which are, therefore, desirably sterilized. Most notable in this group are materials used in the practice of medicine, like instruments; textiles, such as surgical wearing apparel, towels and bed linen; surgical gloves and the like. It will be apparent from the foregoing that the object of the treatment may be the sterilization of the inside of an "empty" sealed container. Here, of course, the material being treated is the air or other gas within the container and the interior surfaces themselves.

The material treated will normally and advantageously be in a closed container. The walls of the containers may be conventional substantially gas-impermeable, microwave-permeable packaging materials like glass, polymethylmethacrylate, polystyrene and polyethylene, as in bottles, jars, flasks and tubes; sheets, especially thermoplastic, heat-sealable films like polyvinylidene chloride, polyethylene terephthalate, copolymers of vinylidene chloride and vinyl chloride, polyethylene, cellophane, plastic-coated paper and cardboard, and the like. The container will be substantially gas tight. The containers may be in any form, such as bottles, jars, flasks, cans, trays, pouches, envelopes, boxes and the like.

The foregoing has been described in terms of using microwave energy as the sole electromagnetic energy. It will be understood that the present invention is adaptable to the conjoint use of microwave energy and infrared radiation by the insertion of infrared radiating means in chamber 1 for radiation of infrared rays to the containers.

What is claimed is:

1. Apparatus for treating articles with microwave energy comprising a chamber, means for admitting microwave energy in a planar fashion into said chamber through a wall thereof at a predetermined site, means within said chamber for supporting articles to be treated by said microwave energy comprising a main turntable adapted to rotate in a plane generally parallel to the plane in which said microwave energy is admitted to said chamber at said site and, supported on said main turntable at a point spaced from the center of said main turntable, at least one relatively small turntable adapted to support an article for treatment with said microwave energy, and drive means for rotating said main turntable and at the same time rotating said relatively small turntable individually whereby said relatively small turntable rotates while at the same time passing in an arc, defined by the rotation of said main turntable toward, past and away from said site where said microwave energy is admitted into said chamber.

2. The apparatus of claim 1 wherein a plurality of relatively small turntables are supported on said main turntable each at a point spaced from the center of said main turntable.

3. The apparatus of claim 1 further comprising means for admitting a gas under superatmospheric pressure to said chamber.

4. The apparatus of claim 3 wherein said gas is a chilled gas and including a source of chilled gas.

5. The apparatus of claim 4 including means for recirculating said gas from said chamber to and through cooling means.

6. Apparatus for treating articles with microwave energy comprising a chamber, means for admitting microwave energy into said chamber in a generally horizontal direction through at least one side wall thereof at a predetermined site spaced above the bottom wall and below the top wall of said chamber, means within said chamber for supporting articles to be treated by said microwave energy comprising a main turntable adapted to rotate in a generally horizontal plane and, mounted upon said main turntable, at a point spaced from the center of said main turntable, at least one relatively small turntable adapted to support an article for treatment with said microwave energy, and drive means for rotating said main turntable and at the same time rotating said relatively small turnable individually whereby said relatively small turntable rotates while at the same time passing in an arc, defined by the rotation of said main turntable toward, past and away from said site where said microwave energy is admitted into said chamber.

7. The apparatus of claim 6 wherein said relatively small turntable has a top supporting surface and said top supporting surface is in a plane generally at or slightly below the site where said microwave energy is admitted into said chamber whereby an article supported thereon is generally horizontally in line with said site.

8. The apparatus of claim 6 wherein a plurality of relatively small rotatable turntables is supported on said main turntable each spaced from the center of said main turntable.

9. The apparatus of claim 6 further comprising means for admitting a gas under superatmospheric pressure to said chamber.

10. The apparatus of claim 9 wherein said gas is a chilled gas and including a source of chilled gas.

11. The apparatus of claim 10 including means for recirculating said gas from said chamber to and through cooling means.

12. In the treatment of an article with microwave energy while said article is in an enclosed zone into which microwave energy is admitted at a predetermined site, the improvement wherein said article, while being subjected to said microwave energy, is supported in a plane generally coinciding with that at which the microwave energy is admitted to said zone and, while so supported, is rotated in a plurality of modes of different magnitude in said plane whereby while said article is moving toward, past and away from said site in a relatively large orbit it is also rotating either about its own axis or in a substantially smaller orbit relative to said large orbit.

13. The method of claim 12 wherein said article rotates about its own axis.

14. The method of claim 12 wherein said article is supported on a relatively small horizontally-rotating surface which in turn is supported on a larger horizontally-rotating surface.

15. The method of claim 12 wherein a plurality of articles is supported on a relatively small horizontally-rotating surface which in turn is supported on a larger horizontally rotating surface.

16. The method of claim 12 wherein a gas under superatmospheric pressure is admitted to said enclosed zone for contact with the external walls of said article while said article is being subjected to microwave energy.

17. The method of claim 16 wherein said gas is at a temperature of no greater than about 60° F. when admitted to said enclosed zone.

References Cited

UNITED STATES PATENTS

| | | | |
|---|---|---|---|
| 2,058,826 | 10/1936 | Reece | 21—102R UX |
| 3,494,722 | 2/1970 | Gray | 21—54 R |
| 3,494,723 | 2/1970 | Gray | 21—54 R |

BARRY S. RICHMAN, Primary Examiner

U.S. Cl. X.R.

21—93, 94, 102 R; 99—21, 150 R, 217, 221, 253; 131—121; 219—10.55